US010285038B2

(12) United States Patent
Hammer et al.

(10) Patent No.: US 10,285,038 B2
(45) Date of Patent: May 7, 2019

(54) METHOD AND SYSTEM FOR DISCOVERING USER EQUIPMENT IN A NETWORK

(71) Applicant: Yaana Technologies, Inc., Milpitas, CA (US)

(72) Inventors: Michael P. Hammer, Reston, VA (US); David Grootwassink, Safety Harbor, FL (US); Rajesh Puri, Fremont, CA (US); Vaibhav Sharma, Milpitas, CA (US)

( * ) Notice: Subject to any disclaimer, the term of this patent is extended or adjusted under 35 U.S.C. 154(b) by 323 days.

(21) Appl. No.: 14/512,283

(22) Filed: Oct. 10, 2014

(65) Prior Publication Data

US 2016/0105787 A1   Apr. 14, 2016

(51) Int. Cl.

| | |
|---|---|
| *H04L 12/709* | (2013.01) |
| *H04L 12/24* | (2006.01) |
| *H04L 12/751* | (2013.01) |
| *H04L 12/28* | (2006.01) |
| *H04W 8/00* | (2009.01) |
| *H04L 29/12* | (2006.01) |
| *H04L 12/26* | (2006.01) |

(52) U.S. Cl.
CPC ......... *H04W 8/005* (2013.01); *H04L 41/5067* (2013.01); *H04L 43/0811* (2013.01); *H04L 61/2015* (2013.01)

(58) Field of Classification Search
IPC .................. H04W 64/003; H04L 12/24,12/26, H04L 29/12
See application file for complete search history.

(56) References Cited

U.S. PATENT DOCUMENTS

| | | |
|---|---|---|
| 6,266,704 B1 | 7/2001 | Reed |
| 6,377,688 B1 | 4/2002 | Numao |
| 6,529,441 B1 | 3/2003 | Cummins |
| 6,574,609 B1 | 6/2003 | Downs |
| 6,765,892 B1 | 7/2004 | Leung |
| 6,785,740 B1 | 8/2004 | Yoneda |

(Continued)

FOREIGN PATENT DOCUMENTS

| | | |
|---|---|---|
| CN | 103838593 | 6/2014 |
| CN | 104869181 | 8/2015 |

(Continued)

OTHER PUBLICATIONS

PCT International Search Report issued Feb. 2, 2016 in corresponding PCT Application No. PCT/US2015/054957 filed Oct. 9, 2015, inventors Michael P. Hammer, et al.

(Continued)

*Primary Examiner* — Faruk Hamza
*Assistant Examiner* — Abusayeed M Haque
(74) *Attorney, Agent, or Firm* — Steptoe & Johnson LLP (57) ABSTRACT

A system and method for discovering user equipment in a network is disclosed. According to one embodiment, a discovery proxy periodically scans an access router that serves a target user equipment and collects an address assignment record of the target user equipment via the access router. The discovery proxy passes the address assignment record to a discovery server, and the discovery server identifies a location of the target user equipment based on the address assignment record of the target user equipment.

28 Claims, 5 Drawing Sheets

(56) References Cited

U.S. PATENT DOCUMENTS

| | | |
|---|---|---|
| 6,990,352 B2 | 1/2006 | Pyhaelammi |
| 7,082,532 B1 | 7/2006 | Vick |
| 7,146,009 B2 | 12/2006 | Andivahis |
| 7,383,433 B2 | 6/2008 | Yeager |
| 7,536,464 B1 | 5/2009 | Dommety et al. |
| 7,561,517 B2 | 7/2009 | Klinker |
| 7,620,033 B2 | 11/2009 | Chu |
| 7,634,522 B1 | 12/2009 | Carter |
| 7,653,815 B2 | 1/2010 | Godfrey |
| 7,739,496 B2 | 6/2010 | Jacobs |
| 7,783,901 B2 | 8/2010 | Carrico |
| 7,796,760 B2 | 9/2010 | Brettle |
| 7,809,943 B2 | 10/2010 | Seidel |
| 7,849,053 B2 | 12/2010 | Wolff |
| 7,961,663 B2 | 6/2011 | Lin |
| 7,966,000 B2 | 6/2011 | Semple |
| 7,969,968 B2 | 6/2011 | De Luca |
| 7,991,158 B2 | 8/2011 | Narendra |
| 8,068,606 B2 | 11/2011 | Schneider |
| 8,149,994 B2 | 4/2012 | Yoon |
| 8,195,147 B2 | 6/2012 | Bonnet |
| 8,218,490 B2 | 7/2012 | Rydnell |
| 8,264,989 B2 | 9/2012 | Suzuki |
| 8,275,891 B2 | 9/2012 | Yasrebi |
| 8,295,830 B1 | 10/2012 | Faccin |
| 8,311,956 B2 | 11/2012 | Sen |
| 8,363,664 B2 | 1/2013 | Ramankutty |
| 8,417,224 B1 | 4/2013 | Young |
| 8,452,957 B2 | 5/2013 | Pourzandi |
| 8,472,384 B2 | 6/2013 | Shu |
| 8,516,244 B2 | 8/2013 | Waters |
| 8,560,835 B2 | 10/2013 | Johansson |
| 8,599,747 B1 | 12/2013 | Saleem |
| 8,634,810 B2 | 1/2014 | Barkie |
| 8,646,063 B2 | 2/2014 | Dowlatkhah |
| 8,667,182 B2 | 3/2014 | Huang |
| 8,667,570 B2 | 3/2014 | Bari |
| 8,677,148 B2 | 3/2014 | O'Hare |
| 8,713,320 B2 | 4/2014 | Xu |
| 8,738,898 B2 | 5/2014 | Herwono |
| 8,738,916 B2 | 5/2014 | Klassen |
| 8,755,342 B2 | 6/2014 | Iyer |
| 8,755,370 B1* | 6/2014 | Biswas ............... H04L 12/6418 370/352 |
| 8,755,392 B2 | 6/2014 | Traversat |
| 8,811,401 B2 | 8/2014 | Stroud |
| 8,831,227 B2 | 9/2014 | Ge |
| 8,867,339 B2 | 10/2014 | Hu |
| 8,891,407 B2 | 11/2014 | Collins |
| 8,924,574 B2 | 12/2014 | Alex |
| 8,996,854 B2 | 3/2015 | Hamalainen |
| 9,013,992 B2 | 4/2015 | Perkins |
| 9,036,540 B2 | 5/2015 | Bu |
| 9,047,107 B2 | 6/2015 | Walsh |
| 9,172,703 B2 | 10/2015 | Chaturvedi |
| 9,191,803 B2 | 11/2015 | Patel |
| 9,225,647 B2 | 12/2015 | Manuguri |
| 9,230,001 B2 | 1/2016 | Magdon-Ismail |
| 9,325,495 B2 | 4/2016 | Roberts |
| 9,379,891 B2 | 6/2016 | Yoon |
| 9,383,969 B2 | 7/2016 | Van Der Sluis |
| 9,432,258 B2 | 8/2016 | Van Der Merwe |
| 9,473,574 B2 | 10/2016 | Vandwalle |
| 9,712,421 B2 | 7/2017 | Dolson |
| 9,736,111 B2 | 8/2017 | Lopez Da Silva |
| 9,860,195 B2 | 1/2018 | Javali |
| 9,876,759 B2 | 1/2018 | Ghai |
| 2002/0156987 A1 | 10/2002 | Gajjar |
| 2002/0166056 A1 | 11/2002 | Johnson |
| 2003/0070070 A1 | 4/2003 | Yeager |
| 2003/0081607 A1 | 5/2003 | Kavanagh |
| 2003/0133443 A1 | 7/2003 | Klinker |
| 2003/0147536 A1 | 8/2003 | Andivahis |
| 2004/0034776 A1 | 2/2004 | Fernando |
| 2004/0034778 A1 | 2/2004 | Celik |
| 2004/0042416 A1 | 3/2004 | Ngo |
| 2004/0064688 A1 | 4/2004 | Jacobs |
| 2004/0067761 A1 | 4/2004 | Pyhalammi |
| 2004/0083297 A1 | 4/2004 | Gazzetta |
| 2004/0196978 A1 | 10/2004 | Godfrey |
| 2004/0213179 A1 | 10/2004 | Lundin |
| 2004/0264405 A1 | 12/2004 | MacGregor Scobbie |
| 2004/0266397 A1 | 12/2004 | Smith |
| 2005/0053068 A1 | 3/2005 | Toth |
| 2005/0094651 A1 | 5/2005 | Lutz |
| 2005/0120160 A1 | 6/2005 | Plouffe |
| 2005/0259637 A1 | 11/2005 | Chu |
| 2006/0046714 A1 | 3/2006 | Kalavade |
| 2006/0059091 A1 | 3/2006 | Wang |
| 2006/0204007 A1 | 9/2006 | Doetzkies |
| 2006/0224883 A1 | 10/2006 | Khosravi |
| 2006/0236092 A1 | 10/2006 | Hamalainen |
| 2007/0006296 A1 | 1/2007 | Nakhjiri |
| 2007/0087756 A1 | 4/2007 | Hoffberg |
| 2007/0100981 A1 | 5/2007 | Adamczyk |
| 2007/0156632 A1 | 7/2007 | Wolff |
| 2008/0076425 A1* | 3/2008 | Khetawat ............... H04W 88/12 455/436 |
| 2008/0089239 A1* | 4/2008 | Todd .................. H04N 7/17318 370/252 |
| 2008/0101345 A1 | 5/2008 | Suzuki |
| 2008/0107096 A1* | 5/2008 | Huang ............... H04L 29/12188 370/342 |
| 2008/0137825 A1 | 6/2008 | Yoon |
| 2008/0155278 A1 | 6/2008 | Carrico |
| 2008/0212782 A1 | 9/2008 | Brettle |
| 2008/0279381 A1 | 11/2008 | Narendra |
| 2008/0285452 A1 | 11/2008 | Oran |
| 2009/0060175 A1 | 3/2009 | Schneider |
| 2009/0088147 A1 | 4/2009 | Bu |
| 2009/0259532 A1 | 10/2009 | Bergstraesser |
| 2009/0287922 A1 | 11/2009 | Herwono |
| 2009/0305688 A1 | 12/2009 | Bonnet |
| 2010/0039993 A1 | 2/2010 | Ramankutty |
| 2010/0086119 A1 | 4/2010 | De Luca |
| 2010/0125855 A1 | 5/2010 | Ferwerda |
| 2010/0174907 A1 | 7/2010 | Semple |
| 2010/0246500 A1 | 9/2010 | Rydnell |
| 2011/0016399 A1 | 1/2011 | Yasrebi |
| 2011/0040706 A1 | 2/2011 | Sen |
| 2011/0040858 A1 | 2/2011 | Gum |
| 2011/0069663 A1 | 3/2011 | Shu |
| 2011/0075675 A1 | 3/2011 | Koodli |
| 2011/0141947 A1 | 6/2011 | Li |
| 2011/0154022 A1 | 6/2011 | Cheng |
| 2011/0170545 A1 | 7/2011 | Zheng |
| 2011/0182183 A1 | 7/2011 | Perkins |
| 2011/0191469 A1 | 8/2011 | Oran |
| 2011/0216646 A1 | 9/2011 | Flinta |
| 2011/0219123 A1 | 9/2011 | Yang |
| 2011/0264906 A1 | 10/2011 | Pourzandi |
| 2011/0268121 A1 | 11/2011 | Karino |
| 2011/0320592 A1* | 12/2011 | Kemmerer, Jr. .... H04L 41/0896 709/224 |
| 2012/0030683 A1 | 2/2012 | Kurdi |
| 2012/0084288 A1 | 4/2012 | Abdul-Razzak |
| 2012/0120788 A1 | 5/2012 | Hu |
| 2012/0191860 A1 | 7/2012 | Traversat |
| 2012/0198241 A1 | 8/2012 | O'Hare |
| 2012/0297087 A1 | 11/2012 | Humble |
| 2012/0314854 A1 | 12/2012 | Waters |
| 2012/0331298 A1 | 12/2012 | Xu |
| 2013/0042112 A1 | 2/2013 | Spector |
| 2013/0080586 A1 | 3/2013 | Attanasio |
| 2013/0084896 A1 | 4/2013 | Barkie |
| 2013/0091526 A1 | 4/2013 | Iyer |
| 2013/0128886 A1 | 5/2013 | Shah |
| 2013/0132501 A1 | 5/2013 | Vandwalle |
| 2013/0137399 A1 | 5/2013 | Bari |
| 2013/0159715 A1 | 6/2013 | Klassen |
| 2013/0160080 A1 | 6/2013 | Shin |
| 2013/0160097 A1 | 6/2013 | Dowlatkhah |
| 2013/0219045 A1* | 8/2013 | Agarwal ............... H04L 45/026 709/224 |

(56) References Cited

U.S. PATENT DOCUMENTS

| | | | |
|---|---|---|---|
| 2013/0250771 A1 | 9/2013 | Yu | |
| 2013/0254853 A1 | 9/2013 | Chaturvedi | |
| 2013/0283060 A1 | 10/2013 | Kulkarni | |
| 2013/0301627 A1 | 11/2013 | Chen | |
| 2013/0329725 A1 | 12/2013 | Nakil | |
| 2013/0343388 A1 | 12/2013 | Stroud | |
| 2013/0346629 A1 | 12/2013 | Wang | |
| 2014/0032753 A1 | 1/2014 | Watanabe | |
| 2014/0040338 A1 | 2/2014 | Van Der Sluis Erik | |
| 2014/0040975 A1 | 2/2014 | Raleigh | |
| 2014/0047439 A1 | 2/2014 | Levy | |
| 2014/0129728 A1 | 5/2014 | Alex | |
| 2014/0181933 A1 | 6/2014 | Sanjeev | |
| 2014/0192976 A1 | 7/2014 | Yoon | |
| 2014/0199962 A1 | 7/2014 | Mohammed | |
| 2014/0226478 A1 | 8/2014 | Manuguri | |
| 2014/0241169 A1 | 8/2014 | Collins | |
| 2014/0245014 A1 | 8/2014 | Tuck | |
| 2014/0274000 A1 | 9/2014 | Gosselin | |
| 2014/0286337 A1 | 9/2014 | Dolson | |
| 2014/0301258 A1 | 10/2014 | Belghoul | |
| 2014/0331175 A1 | 11/2014 | Mesguich Havilio | |
| 2014/0344908 A1 | 11/2014 | Rizzo | |
| 2014/0348044 A1 | 11/2014 | Narayanan | |
| 2014/0355520 A1 | 12/2014 | Wallis | |
| 2015/0058876 A1 | 2/2015 | Gasnier | |
| 2015/0065125 A1 | 3/2015 | Patel | |
| 2015/0139230 A1 | 5/2015 | Zha | |
| 2015/0148007 A1 | 5/2015 | Mitchell | |
| 2015/0188919 A1* | 7/2015 | Belton, Jr. | H04M 3/2263 726/4 |
| 2015/0256338 A1 | 9/2015 | Roberts | |
| 2015/0281940 A1 | 10/2015 | Yu | |
| 2015/0304275 A1 | 10/2015 | Ghai | |
| 2015/0372973 A1 | 12/2015 | Lopez Da Silva | |
| 2016/0072766 A1 | 3/2016 | Jain | |
| 2016/0359798 A1 | 12/2016 | Choquette | |
| 2017/0195256 A1 | 7/2017 | Javali | |
| 2017/0250944 A1 | 8/2017 | Hong | |
| 2017/0373961 A1 | 12/2017 | Dolson | |
| 2018/0034770 A1 | 2/2018 | Rajagopalan | |

FOREIGN PATENT DOCUMENTS

| | | | |
|---|---|---|---|
| EP | 1587249 A1 | 10/2005 | |
| EP | 1837815 | 9/2007 | |
| EP | 1993257 | 11/2008 | |
| WO | 2007004938 | 1/2007 | |
| WO | 2009103340 | 8/2009 | |
| WO | 2013035051 | 3/2013 | |
| WO | 2014018425 | 1/2014 | |
| WO | 2015066930 | 5/2015 | |

OTHER PUBLICATIONS

Antopolis, Sophia, Interface for Warrant information Output from LI34 Q&D Li Agnostic; vol. LI No. Vo.07, Jan. 28, 2014.

International Search Report dated May 21, 2015 in corresponding PCT Application No. PCT/US2015/15490 filed Feb. 11, 2015, inventor Puri, Rajesh et al.

Antopolis, Sophia, "Lawful Interception (LI); Retained Data; Requirements of Law Enforcement Agencies for handling Retained Data", ETSI Draft; Jan. 27, 2009.

Extended European Search Report dated Feb. 16, 2018 in corresponding EP Application No. 15749222.4 filed Sep. 12, 2016, inventor Grootwassink, David et al.

Antopolis, Sophia, Universal Mobile Telecommunications System (UMTS) LTE; 3G security; Lawful Interception architecture and functions, version 10.4.0., Jun. 1, 2011.

International Search Report dated Jul. 8, 2015 in corresponding PCT Application No. PCT/US2015/016961 filed Feb. 20, 2015, inventor(s) Grootwassink, David, et al.

International Search Report dated Oct. 30, 2015, issued in International Application No. PCT/US2015/023626 filed Mar. 31, 2015, inventor, Grootwassink, David et al.

International Search Report dated Feb. 2, 2016, issued in International Application No. PCT/US2015/054957 filed Oct. 9, 2015, inventor Hammer, Michael et al.

International Search Report dated Jan. 28, 2016, issued in International Application No. PCT/US2015/061976 filed Nov. 20, 2015, inventor Puri, Rajesh et al.

International Search Report dated Jun. 22, 2015, issued in International Application No. PCT/US2015/20755 filed Mar. 16, 2015, inventor Puri, Rajesh et al.

International Search Report dated Jul. 29, 2016, issued in International Application No. PCT/US2016/030311 filed Apr. 29, 2016, inventor Hammer, Michael et al.

International Search Report dated Jan. 30, 2017 in corresponding PCT Application No. PCT/US2016/061894 filed Nov. 14, 2016, inventor Puri, Rajesh et al.

International Search Report dated Feb. 3, 2017, issued in International Application No. PCT/US2016/061897 filed Nov. 14, 2016, inventor Hammer, Michael et al.

International Search Report dated Apr. 25, 2017, issued in International Application No. PCT/US2017/17560 filed Feb. 10, 2017, inventor Hammer, Michael et al.

Arnedo-Moreno et al, JXTA resource access control by means of advertisement encryption, Future Generation computer Systems 26 (2009) pp. 21-28, Elsevier.

Ford et al., Peer-to-Peer Communication Across Network Address Translators, 2005, Usenix.

Supplementary European Search Report dated Feb. 5, 2018 in corresponding EP Application No. 15751839.0 filed Sep. 21, 2016, inventor Grootwassink, David et al.

Written Opinion of the International Searching Authority dated May 21, 2015, issued in International Application No. PCT/US2015/015490.

Written Opinion of the International Searching Authority dated Oct. 30, 2015, issued in International Application No. PCT/US2015/023626.

Written Opinion of the International Searching Authority dated Jul. 8, 2015, issued in International Application No. PCT US2015/016961.

Written Opinion of the International Searching Authority dated Feb. 2, 2016, issued in International Application No. PCT/US2015/054957.

Written Opinion of the International Searching Authority dated Jan. 28, 2016, issued in International Application No. PCT/US2015/061976.

Written Opinion of the International Searching Authority dated Jun. 22, 2015, issued in International Application No. PCT/US2015/020755.

Written Opinion of the International Searching Authority dated Jul. 29, 2016, issued in International Application No. PCT/US2016/030311.

Written Opinion of the International Searching Authority dated Jan. 30, 2017, issued in International Application No. PCT/US2016/061894.

Written Opinion of the International Searching Authority dated Feb. 3, 2017, issued in International Application No. PCT/US2016/061897.

* cited by examiner

Figure 5

METHOD AND SYSTEM FOR DISCOVERING USER EQUIPMENT IN A NETWORK

FIELD

The present disclosure generally relates to network communications and, more particularly, to a method and system for discovering user equipment in a network.

BACKGROUND

An Internet service provider (ISP) builds a packet network to enable users to access various services over the Internet. Unlike a network that evolved from a telephony network, some ISPs do not support voice, email, and other services in-house. The ISPs control the network access by users by provisioning a security mechanism in an access node (e.g., a network router, a switch) and user equipment (UE) (e.g., a cable-modem). However, small ISPs may lack a sophisticated security mechanism such as an operation support system (OSS) and a subscriber management system that a large telephone company typically implements.

Some ISPs provide wireless access to user devices via a point-to-point radio link from a directional antenna on a building roof to a radio tower. Other ISPs may rely on wireless hotspots with omnidirectional antennas to connect users. A user may be a credit-card holder who uses a credit-card transaction to substitute an authentication to the network.

Some ISPs may distribute subscriber-related information to an access edge of their network, however the distribution of subscriber-related information presents challenges to an ISP network operator for identifying and isolating packet traffic of a specific user. Furthermore, the ISP networks must support various types of access nodes and UE nodes. The distribution of subscriber-related information further makes it difficult for the ISP network operator to manage their network while providing security to the users and meeting regulatory compliance obligations.

SUMMARY

A system and method for discovering user equipment in a network is disclosed. A system and method for discovering user equipment in a network is disclosed. According to one embodiment, a discovery proxy periodically scans an access router that serves a target user equipment and collects an address assignment record of the target user equipment via the access router. The discovery proxy passes the address assignment record to a discovery server, and the discovery server identifies a location of the target user equipment based on the address assignment record of the target user equipment.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for discovering user equipment in a network is disclosed. A system and method for discovering user equipment in a network is disclosed. According to one embodiment, a discovery proxy periodically scans an access router that serves a target user equipment and collects an address assignment record of the target user equipment via the access router. The discovery proxy passes the address assignment record to a discovery server, and the discovery server identifies a location of the target user equipment based on the address assignment record of the target user equipment.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

Figure 1:
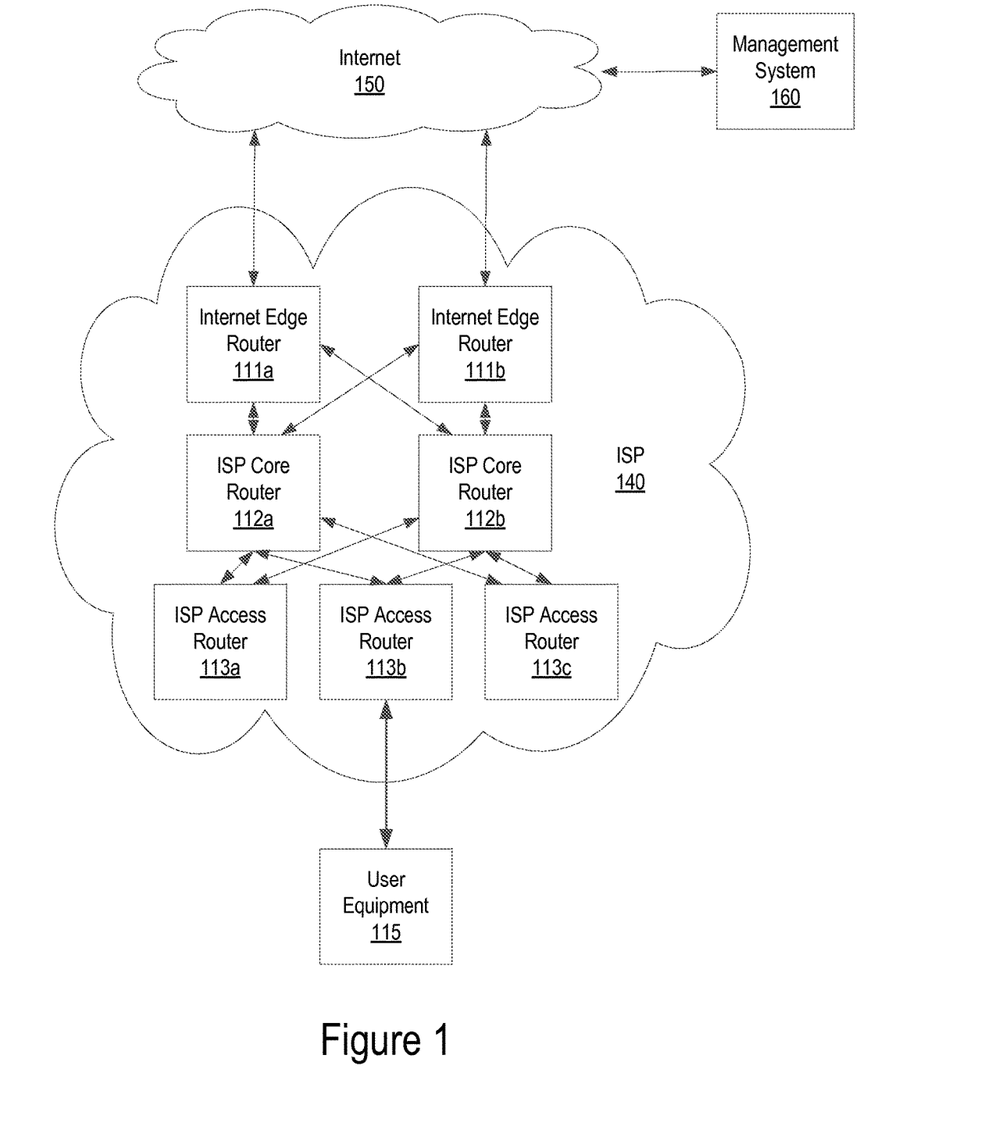
FIG. 1 illustrates system architecture of an exemplary ISP network, according to one embodiment.

FIG. 1 illustrates system architecture of an exemplary ISP network, according to one embodiment. User equipment (UE) 115 is connected to the Internet 150 via an Internet service provider (ISP) network 140. The ISP network 140 includes Internet edge routers 111a and 111b, access routers 113a, 113b, and 113c, and core routers 112a and 112b. However, it is noted that the ISP network 140 can include any number of Internet edge routers, access routers, and core routers without deviating from the scope of the present disclosure. Internet edge routers 111a and 111b connect the ISP network 140 to the Internet 150 at various points that may be geographically separated depending on the size of the ISP network 140. Access routers 113a, 113b, and 113c provide a protocol for managing addressing and connectivity in the network (e.g., dynamic host control protocol (DHCP)) and connect the UE 115 to the ISP network 140. Core routers 112a and 112b connect and aggregate data traffic from the access routers 113a, 113b, and 113c to the Internet edge routers 111a and 111b. The ISP network 140 provides alternate paths of the UE 115 to the Internet 150 using various edge routers, core routers, and access routers to support higher reliability of service to the access routers 113. For simplicity, the term, "router" is herein used to represent different network transport elements within the ISP network 140.

According to one embodiment, the present system and method provides a management system 160. The management system 160 may be externally located from the ISP network 140 and connected to the ISP network 140 via the Internet 150 or internally located within the ISP network 140. The management system 160 locates the UE 115 that is connected to the ISP network 140 by requesting the access router 113b that is attached to the target UE 115 to send information or data traffic related to the UE 115. The management system 160 processes the received information or data traffic related to the UE 115 and determines the location as well as the connectivity status of the target UE 115. The target UE 115 may be attached to any access router within the ISP network 140 at any given time or move from one access router to another access router.

Figure 2:
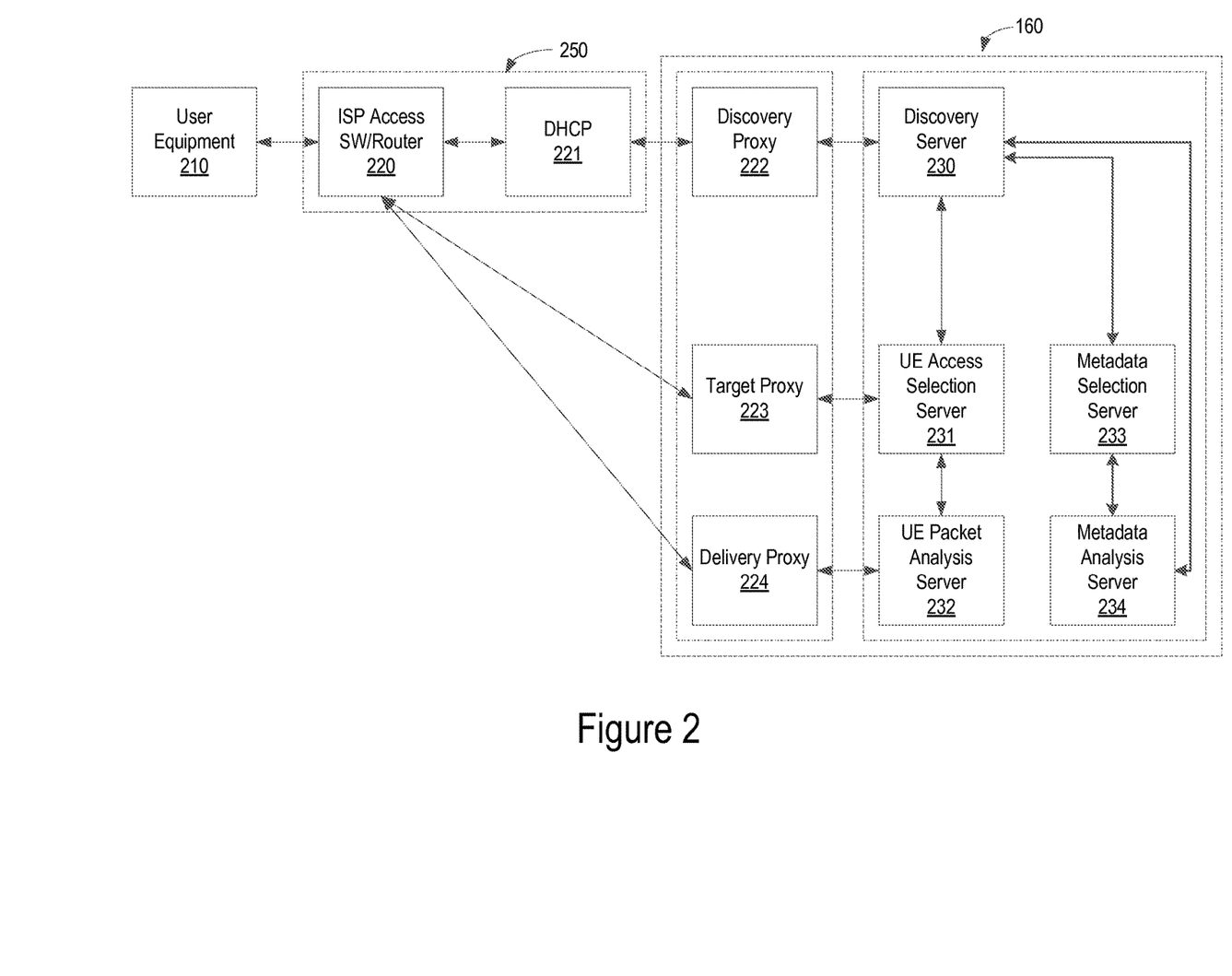
FIG. 2 illustrates a schematic diagram of an exemplary ISP network including a management system, according to one embodiment.

FIG. 2 illustrates a schematic diagram of an exemplary ISP network including a management system, according to one embodiment. The ISP network includes a UE 210, an access router 220, and a DHCP router 221. There may be several UEs, access routers, and DHCP routers within the ISP network without deviating from the scope of the present disclosure. Each UE may be connected to one or more access routers. More than one UEs may be connected to a single access router.

According to one embodiment, the present system and method provides a management system 160 including a discovery proxy 222, a target proxy 223, and a delivery proxy 224. The management system 160, particularly the discover proxy 222, is capable of handling a wide variety of router types, registration protocols, registration record types, address types, and connectivity data record types. Therefore, the management system 160 is capable of working over an ISP network that evolved through mergers and acquisitions, thus comprises various network protocols and types. The management system 160 may be located inside or outside of an ISP network. If the management system 160 is located outside an ISP network, as illustrated in FIG. 1, the management system 160 communicates with the access router 220 via at least one Internet edge router and/or a core router (not shown). The access router 220 may incorporate a DHCP node 221 as represented by a dashed line 250, or the DHCP node 221 may be implemented in a separate node from the access router 220. The DHCP node 221 may be located on a host that is accessible by multiple access routers. The DHCP standard is defined and managed by the Internet Engineering Task Force (IETF).

The discovery proxy 222 periodically scans the access routers and DHCP nodes to collect address assignment records of attached UEs with their associated identities and addresses, and passes the address assignment records to a discovery server 230. Using the address assignment records of the UEs, the discovery server 230 performs the UE location discovery function (LDF). The discovery proxy 222 watches for state changes of the attached UEs by inspecting DHCP logs, authentication, authorizing and accounting (AAA) logs, and other log and status information available in the ISP network. For example, the discovery proxy 222 supports a dynamically provisioned user network such as coffee shop hotspots and hotel networks.

The discovery server 230 searches for a record of a target UE (e.g., UE 210) over its data repository, correlates the state change information of the target UE, and links the identity and address to the target UE. Once a state change is detected, the discovery server 230 triggers an access selection server 231 to submit a targeting request to the ISP network. The access selection server 231 has a UE access selection function (ASF) and submits the targeting request to the ISP network through a target proxy 223. The target proxy 223 has the permission and a protocol to access a specific access router 220 that serves the target UE 210. The access router 220 establishes a connection to the delivery proxy 224 that maintains a permanent connection to a packet analysis server 232.

According to one embodiment, the discovery proxy 222, the target proxy 223, and the delivery proxy 224 may be located on separate physical nodes, combined in a single physical node, and any combination of proxy functions may be implanted on a particular physical node. Likewise, the discovery server 230, the access selection server 231, and the packet analysis server 232 may be located on separate or any combination of physical servers. Furthermore, the servers may be operated inside an ISP network, or remotely outside the ISP network in a partner network (e.g., a trusted third party network).

According to one embodiment, the management system 160 further comprises a metadata selection server 233 and a metadata analysis server 234. The metadata selection server 233 and the metadata analysis server 234 are connected to each other and to the discovery server, respectively. The metadata selection server 233 receives a request for connectivity status of the user equipment 210 from a requesting system and sends a response to the requesting system. The requesting system may be internal or external to the ISP network. The discovery server 230 maintains a repository of connectivity information of user equipment to the network and sends the connectivity information of a target user equipment to the metadata analysis server 234. The metadata analysis server 234 provides the analysis of the connectivity status of the target user equipment to the metadata selection server 233 that responds to the requesting system. The process of providing connectivity status of a target user equipment is discussed in further detail below with reference to FIG. 4.

Figure 3:
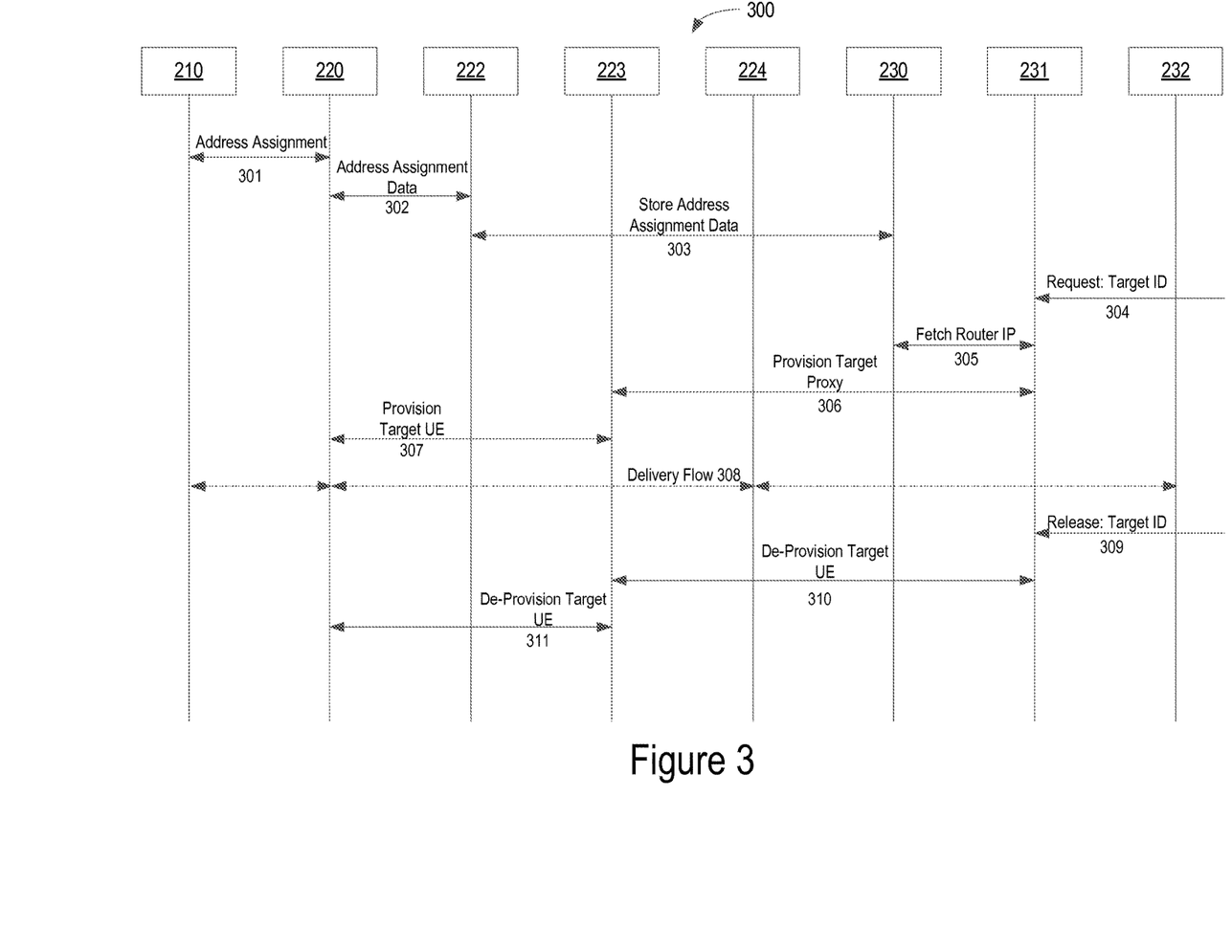
FIG. 3 illustrates an exemplary discovery process of target user equipment in an ISP network, according to one embodiment.

FIG. 3 illustrates an exemplary discovery process of target user equipment in an ISP network, according to one embodiment. Various proxies and servers may be used, independently or in any combination, to allow each discovery function to scale independently according to a processing speed and memory capacity required to perform each function.

The UE 210 in an ISP network performs a network entry process that involves a request for address assignment to an access router 220. In operation 301, the UE 210 makes an address assignment request for a network entry to the access router 220 by providing equipment-related identities and credentials and receives an IP address and other host configuration parameters from the access router 220. The host configuration parameters may include a supporting DHCP server (not shown) that assigns the IP address of the UE 210. The address assignment (or address binding) information between the UE 210 and the access router 220 is maintained as long as the UE 210 connects with the access router 220.

In operation 302, the discovery proxy 222 periodically contacts each of the access routers in the network and requests an update to the address assignment data between the access router 220 and the UE 210. The discovery proxy 222 is provisioned with a list of routers to monitor and credentials to authenticate itself to each of the routers. In addition, the discovery proxy 222 provides a secure link to other proxies or servers within the ISP network or cloud-based servers or hosts that are remotely located outside the ISP network.

In operation 303, the discovery proxy 222 passes the address assignment data between the UE 210 and the access router 220 to a discovery server 230. According to one embodiment, the discovery proxy 222 does not store the data collected from the access router 220, but instead sends the data to the discovery server 230 where the address assignment data is stored in a data store. The discovery server 230 processes the received address assignment data from the access router 220 and performs a search and cross-referencing with other sources of data that correlates with the name and addressing identities of the UEs. Examples of other sources of data included, but are not limited to, data received from authentication, authorization, and accounting (AAA) nodes, operations support systems (OSS), and business support systems (BSS).

In operation 304, a management system or a third party service provides a monitoring request for monitoring a particular user's data traffic to the access selection server 231. The management system provides a target identity such as a name of an address that may not be directly visible to the access router 220. The access selection server 231 manages a life-cycle of the monitoring request and activates and deactivates the monitoring request. The life-cycle of monitoring the user may span multiple connection activations and deactivations that may result from either intermittent connectivity while stationary or due to mobility where the user connects to a sequence of access routers. Thus, a single request to monitor a user, may translate into a series of monitoring activations/deactivation requests to a series of access routers, herein referred to as dynamic triggering.

In operation 305, the access selection server 231 provides a monitor request to the discovery server 230 to perform a series of mappings to discover the identity and IP address of the access selection server 231 that serves the target UE 210 in the network, and returns the access selection server 231 with parameters to provision the target UE 210. The parameters that the discovery server 230 sends to the access selection server 231 in response to the monitor request include, for example, but not limited to, the connectivity information between the access router 220 and the target proxy 223, and between the access router 220 and the delivery proxy 224, and the user information on the UE 210. Using these parameters, the access selection server 231 determines that the user on the UE 210 attached to the access router 220 can be activated by the target proxy 223 to deliver to the delivery proxy 224.

In operation 306, the access selection server 231 formulates and sends a provisioning request to the target proxy 223. The target proxy 223 performs the same ISP network internal and backhaul security functions as the other proxies. The target proxy 223 then connects to the selected access router 220 and manages the provisioning connectivity to the access router 220 in operation 307. The provisioned information includes the identity of the delivery proxy 224 and the packet analysis server 232, information to correlate the delivered packet stream with the correct target request, and required signature and encryption parameters, as needed.

In operation 308, copies of packets flow between the access router 220 and the packet analysis server through the delivery proxy 224. The delivery proxy 224 provides reliable and loss-free connectivity for data streaming between the access router 220 and the packet analysis server 232. The packet analysis server 232 performs various analyses of the UE packets. For example, a user complains that his/her voice over IP (VoIP) voice audio is poor, and the packet analysis server 232 determines that another user's gaming application is hogging the bandwidth and suggests the user to implement some form of quality of service (QoS) controls to improve the voice quality of his/her VoIP application. In operation 309, the management system submits a target release request to the access selection server 231. Similar to the provisioning process, the access selection server 231 formulates and sends a de-provisioning request to the target proxy 223 in operation 310. The target proxy 223 connects to the selected access router 220 and de-provisions the target UE 210 in operation 311. After the de-provisioning of the target UE 210, the access router 220 removes the monitoring function and stops the replicated packet flow to the delivery proxy 224.

In some embodiments, the access selection server 231 may have additional provisioning and de-provisioning flows to the delivery proxy 224 or the packet analysis server 232 to provide the correlation information to the delivery proxy 224 or the packet analysis server 232 instead of the access router 220.

Figure 4:
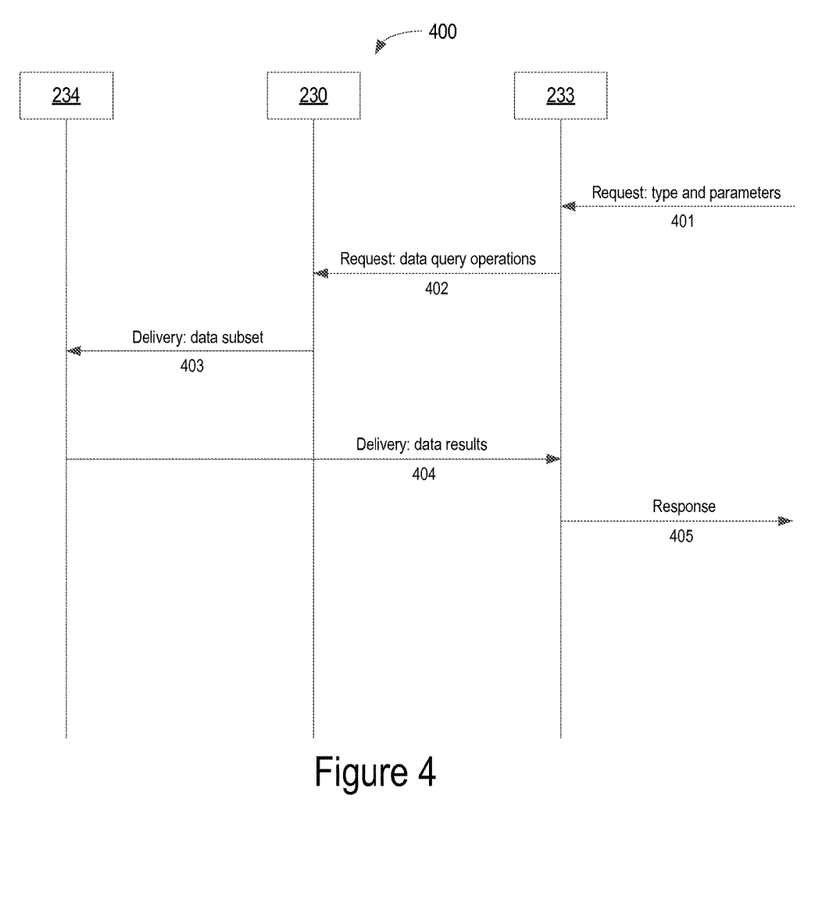
FIG. 4 illustrates an exemplary process for monitoring connectivity status of target user equipment in an ISP network, according to one embodiment.

FIG. 4 illustrates an exemplary process for monitoring connectivity status of target user equipment in an ISP network, according to one embodiment. In operation 401, the metadata selection server 233 receives a request from an external system (not shown) including a type and one or more parameters to identify a target user equipment in the ISP network. In operation 402, the metadata selection server 233 sends a data query request to the discovery server 230. In operation 403, the discovery server 230 the requested data subset to the metadata analysis server 234. In operation 404, the metadata analysis server 234 sends the data results to the metadata selection server 233. In operation 405, the metadata selection server 233 sends the response including an answer to the requesting external system.

The discovery server 230 maintains a repository of connectivity information of target user equipment to the network. Using the connectivity information of target equipment, the discovery server 230 can discover various information about the target user equipment, for example, but not limited to:

- history of IP addresses that a target user is connected from and a list of access routers that the target user is connected to.
- users who are connected to a target user equipment using the IP address of the target user equipment.
- history of connection requests for an access router (e.g., to determine the status of the access router)
- an outage report to a governing agency (e.g., Federal Communications Commission (FCC)).
- connectivity periods of the target user to adjust billing, as needed.

Figure 5:
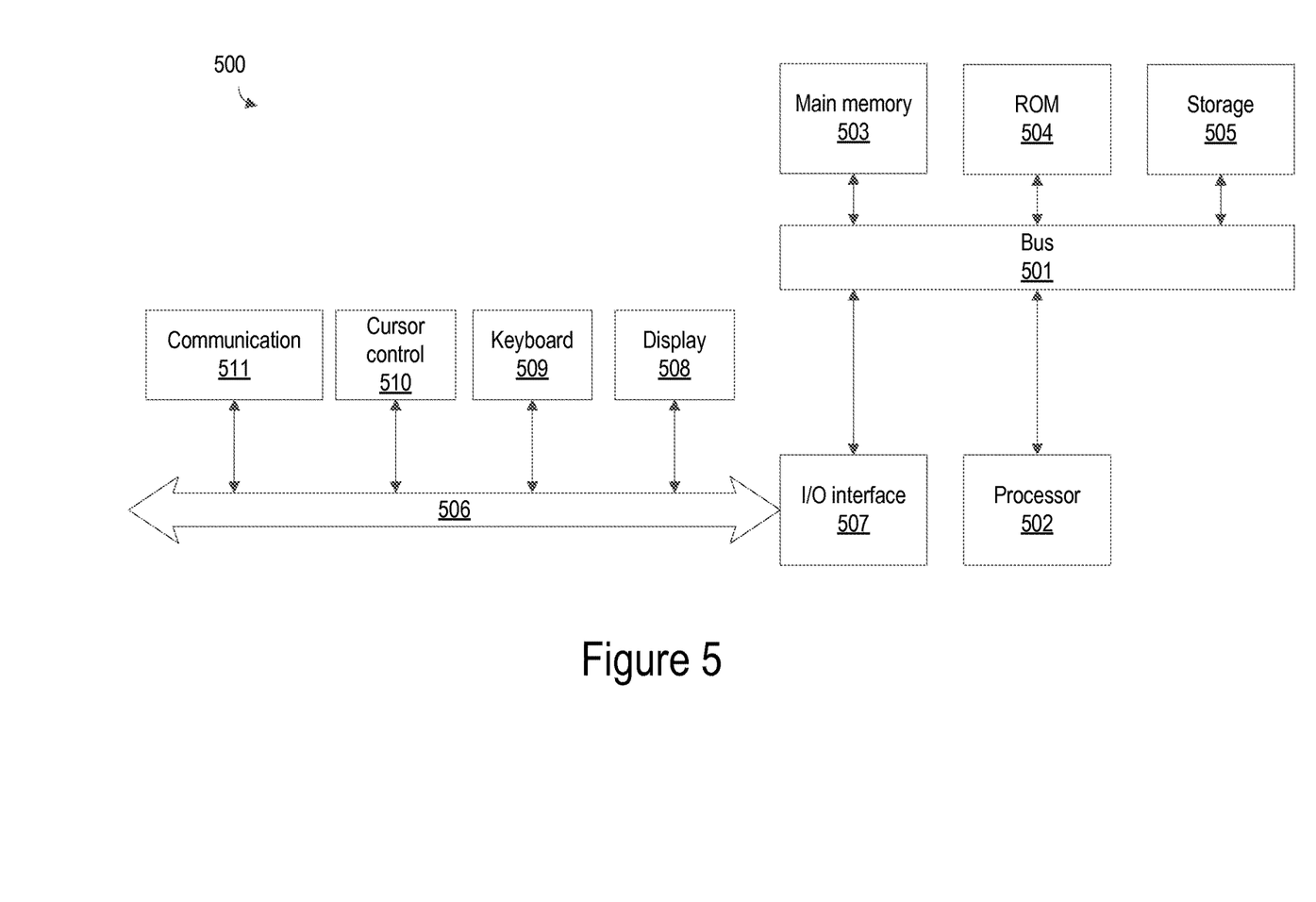
FIG. 5 illustrates an exemplary computer architecture that may be used for the present system, according to one embodiment.

FIG. 5 illustrates an exemplary computer architecture that may be used for the present system, according to one embodiment. The exemplary computer architecture may be used for implementing one or more components described in the present disclosure including, but not limited to, the present content curation system. One embodiment of architecture 500 includes a system bus 501 for communicating information, and a processor 502 coupled to bus 501 for processing information. Architecture 500 further includes a random access memory (RAM) or other dynamic storage device 503 (referred to herein as main memory), coupled to bus 501 for storing information and instructions to be executed by processor 502. Main memory 503 also may be used for storing temporary variables or other intermediate information during execution of instructions by processor 502. Architecture 500 may also include a read only memory (ROM) and/or other static storage device 504 coupled to bus 501 for storing static information and instructions used by processor 502.

A data storage device 505 such as a magnetic disk or optical disc and its corresponding drive may also be coupled to architecture 500 for storing information and instructions. Architecture 500 can also be coupled to a second I/O bus 506 via an I/O interface 507. A plurality of I/O devices may be coupled to I/O bus 506, including a display device 508, an input device (e.g., an alphanumeric input device 509 and/or a cursor control device 510).

The communication device 411 allows for access to other computers (e.g., servers or clients) via a network. The communication device 411 511 may include one or more modems, network interface cards, wireless network interfaces or other interface devices, such as those used for coupling to Ethernet, token ring, or other types of networks.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A method comprising:
    periodically scanning an access router that serves a target user equipment to detect a state change of the target user equipment by inspecting one or more of a DHCP log, authentication log, authorizing log, and accounting log of the access router;
    collecting an address assignment record of the target user equipment via the access router;
    passing the address assignment record to a discovery server, wherein the discovery server correlates the address assignment record with one or more data sources, the data sources including authentication, authorization, and accounting (AAA) nodes, operations support systems (OSS), and business support systems (BSS);
    identifying a location of the target user equipment at the discovery server based on the address assignment record of the target user equipment;
    replicating a packet flow of the target user equipment as seen by the access router; and
    monitoring the packet flow to determine quality of service issues experienced by the target user equipment.

2. The method of claim 1, wherein the network is an Internet service provider network.

3. The method of claim 1, further comprising implementing a dynamic host configuration protocol (DHCP) by the access router and assigning an IP address of the user equipment.

4. The method of claim 1, further comprising, at the discovery server, communicating with an access selection server at the discovery server and generating a targeting request to a target proxy.

5. The method of claim 4, further comprising managing a life-cycle of the targeting request by the access selection server including activating and deactivating the targeting request.

6. The method of claim 5, wherein the life-cycle of the targeting request comprises a series of monitoring activations and deactivation requests to a series of access routers.

7. The method of claim 4, further comprising sending the targeting request by the target proxy to the access router that serves the target user equipment.

8. The method of claim 7, further comprising establishing a connection by the access router to a delivery proxy.

9. The method of claim 8, further comprising collecting one or more of user information of a user attached to the access router, connectivity information between the access router to the target proxy, and connectivity information between the access router to the delivery proxy.

10. The method of claim 8, further comprising replicating packets associated with the target user equipment by the delivery proxy to a packet analysis server for analyzing the packets.

11. The method of claim 10, further comprising sending a de-provisioning request by the access selection server to the target proxy.

12. The method of claim 11, further comprising connecting the target proxy to the access router and de-provisioning the target user equipment.

13. The method of claim 1, further comprising:
receiving a request for connectivity status of the target user equipment at a metadata selection server;
generating a data query request to the discover server;
sending connectivity information of the target user equipment to a metadata analysis server;
generating a response to the request for connectivity status at the metadata analysis server; and
providing the response via the metadata selection server.

14. The method of claim 13, wherein the response is selected from a group comprising: history of IP addresses that a target user is connected from and a list of access routers that the target user is connected to, users who are connected to the target user equipment using an IP address of the target user equipment; history of connection requests for the access router; an outage report to a governing agency; and connectivity periods of the target user.

15. A system comprising:
a user equipment;
an access router that is configured to bind with the user equipment;
a discovery proxy configured to periodically scan the access router and collect an address assignment record of the user equipment via the access router, to detect a state change of a target user equipment by inspecting one or more of a DHCP log, authentication log, authorizing log, and accounting log of the access router;
a discovery server that is configured to receive the address assignment record from the discovery proxy and identify a location of the user equipment based on the address assignment record of the target user equipment, wherein the discovery server correlates the address assignment record with one or more data sources, the data sources including authentication, authorization, and accounting (AAA) nodes, operations support systems (OSS), and business support systems (BSS); and
a packet analysis server that receives a replicated packet flow of the target user equipment and monitors the replicated packet flow to determine quality of service issues experienced by the target user equipment.

16. The system of claim 15, wherein the network is an Internet service provider network.

17. The system of claim 15, wherein the access router implements a dynamic host configuration protocol (DHCP) and assigns an IP address of the user equipment.

18. The system of claim 15 further comprising an access selection server and a target proxy, wherein the discovery server communicates with the access selection server to generate a targeting request to the target proxy.

19. The system of claim 18, wherein the access selection server manages a life-cycle of the targeting request and activates and deactivates the targeting request.

20. The system of claim 19, wherein the life-cycle of the targeting request comprises a series of monitoring activations and deactivation requests to a series of access routers.

21. The system of claim 18, wherein the target proxy sends the targeting request to the access router that serves the user equipment and manages provisioning connectivity to the access router.

22. The system of claim 21 further comprises a delivery proxy, wherein at the request of the targeting request from the target proxy, the access router establishes a connection to the delivery proxy.

23. The system of claim 22 further comprise a packet analysis server, wherein the delivery proxy replicates packets associated with the user equipment to the packet analysis server, and the packet analysis server analyzes the packets.

24. The system of claim 23, wherein the access selection server sends a monitor request to the discovery server and receives from the discovery server one or more of user information of a user attached to the access router, connectivity information between the access router to the target proxy, and connectivity information between the access router to the delivery proxy.

25. The system of claim 23, wherein the access selection server sends a de-provisioning request to the target proxy.

26. The system of claim 25, wherein the target proxy connects to the access router and de-provisions the user equipment.

27. The system of claim 15, further comprising:
a metadata selection server; and
a metadata analysis server,
wherein the metadata selection server receives a request for connectivity status of the target user equipment and generates a data query request to the discover server,
wherein the discover server sends connectivity information of the target user equipment to the metadata analysis server,
wherein the metadata analysis server generates a response to the request for connectivity status; and
wherein the metadata selection server provides the response.

28. The system of claim 27, wherein the response is selected from a group comprising: history of IP addresses that a target user is connected from and a list of access routers that the target user is connected to, users who are connected to the target user equipment using an IP address of the target user equipment; history of connection requests for the access router; an outage report to a governing agency; and connectivity periods of the target user.

* * * * *